United States Patent
Bocos et al.

(10) Patent No.: US 8,944,098 B1
(45) Date of Patent: Feb. 3, 2015

(54) AIRFLOW RESTRICTING VALVE ASSEMBLY

(76) Inventors: Juan Carlos Bocos, Sunny Isles Beach, FL (US); Juan Carlos Bocos Vilar, Sunny Isles Beach, FL (US)

( * ) Notice: Subject to any disclaimer, the term of this patent is extended or adjusted under 35 U.S.C. 154(b) by 451 days.

(21) Appl. No.: 13/152,842

(22) Filed: Jun. 3, 2011

(51) Int. Cl.
 *F16K 15/02* (2006.01)

(52) U.S. Cl.
 USPC .................. 137/512.1; 137/512.5; 137/601.2

(58) Field of Classification Search
 CPC ... F16K 15/021; F16K 15/025; F16K 15/026; F16K 15/06; F16K 15/063; F16K 15/066; E03B 7/077
 USPC .............. 137/512.1, 512.5, 516.13, 538, 540, 137/601.2; 73/276
 See application file for complete search history.

(56) References Cited

U.S. PATENT DOCUMENTS

| | | | |
|---|---|---|---|
| 917,449 A | 4/1909 | Jones | |
| 946,684 A * | 1/1910 | Neighbors | 137/512.1 |
| 1,349,253 A | 8/1920 | Astrom | |
| 1,385,932 A * | 7/1921 | Stayman | 137/512.1 |
| 1,644,265 A | 10/1927 | Noble | |
| 1,811,166 A | 6/1931 | Yardley | |
| 1,828,697 A | 10/1931 | Yardley | |
| 1,860,004 A | 5/1932 | Yardley | |
| 1,889,805 A | 12/1932 | Johnson | |
| 2,071,969 A * | 2/1937 | Diescher | 137/601.2 |
| 2,960,998 A | 11/1960 | Sinker et al. | |
| 3,053,500 A | 9/1962 | Atkinson | |
| 3,299,704 A | 1/1967 | Wilson | |
| 3,565,100 A | 2/1971 | Pfleger | |
| 4,523,607 A | 6/1985 | Daghe et al. | |
| 4,691,727 A | 9/1987 | Zorb et al. | |
| 5,088,521 A | 2/1992 | Johnson | |
| 5,113,900 A | 5/1992 | Gilbert | |
| 5,161,572 A | 11/1992 | Oberl et al. | |
| 5,439,984 A | 8/1995 | Kodama et al. | |
| 5,482,080 A | 1/1996 | Bergmann | |
| 5,918,619 A | 7/1999 | Woods et al. | |
| 5,967,181 A | 10/1999 | Momont et al. | |
| 5,988,705 A | 11/1999 | Norkey | |
| 6,152,171 A | 11/2000 | Messick et al. | |
| 6,357,477 B1 * | 3/2002 | Walcott et al. | 137/599.15 |
| 6,397,884 B1 | 6/2002 | Miyajima et al. | |
| 6,532,764 B1 | 3/2003 | Tsugawa et al. | |
| 7,121,293 B2 * | 10/2006 | Walter et al. | 137/601.2 |
| 2004/0050427 A1 * | 3/2004 | Ryabtsev et al. | 137/541 |
| 2006/0185736 A1 | 8/2006 | Cavagna | |
| 2008/0184792 A1 * | 8/2008 | Parris et al. | 73/276 |

(Continued)

*Primary Examiner* — John Rivell
(74) *Attorney, Agent, or Firm* — Malloy & Malloy, P.L.

(57) ABSTRACT

A valve assembly is disposed within a water supply line upstream of a water meter or other delivery location and is structured to eliminate or significantly reduce the passage of air there through to the upstream location. A valve body includes a sealing portion sealing disposed within the supply line and in interruptive, exposed relation to a path of fluid flow there through. One or more valve members are biased into sealing relation to a plurality of valve seat openings formed in the sealing portion. A sufficient, predetermined biasing force is exerted on the valve members to maintain them into a sealing orientation with the valve seats, thereby preventing the opening of the valve members until a sufficient water pressure is exerted thereon by a flow water, from which the air has been removed, along the path of fluid flow. As a result, air included within the water flow supply line will be compressed and/or displaced and substantially prevented from passing independently or mixed with the flow of water downstream of the valve body.

18 Claims, 6 Drawing Sheets

(56) References Cited

U.S. PATENT DOCUMENTS

2009/0289207 A1  11/2009  Barreda et al.
2010/0257916 A1  10/2010  Barreda et al.
2012/0118406 A1* 5/2012  Edgeworth .................. 137/551

* cited by examiner

AIRFLOW RESTRICTING VALVE ASSEMBLY

BACKGROUND OF THE INVENTION

1. Field of the Invention

This invention relates to a valve assembly disposed along a path of fluid flow within a water supply line. The valve assembly is structured to eliminate or significantly reduce the passage of air to a location downstream of the valve assembly, wherein the air may be in the form of air pockets or air segments or otherwise mixed and/or included in the path of fluid flow along which the water travels within the water supply line. As a result a downstream location of delivery, such as a water meter, will only register the actual quantity of water delivered and avoid any charges resulting from the passage of air through the meter.

2. Description of the Related Art

Approximately three and one-half billion people throughout the world have access to a water supply delivered to a domestic or commercial facility by a water supply line(s) in the form of pipes, conduits, etc. The origin of the water supply, especially in an urban environment, is typically from a public or regulated water utility which controls the supply, delivery, purification, and/or other processing of the water being delivered. Alternatively, many domestic facilities rely individually or collectively on wells or other underground sources of water which are not under the control a public water utility company. In either situation, it is recognized that water must be delivered to a facility with sufficient pressure to assure an adequate quantity of water being supplied at a sufficient flow rate for use in variety of different applications.

Water pressures may vary at different locations through out a given geographical area and are based in large part upon the structure and/or efficiency of the corresponding distribution system. By way of example, water mains below ground may operate at a higher pressure in order to deliver the water to distribution stations. Moreover, "pressure reducers" or like structures are frequently disposed in the path of water flow at such distribution locations prior to being delivered to the domestic or commercial facility. Accordingly, water may be delivered to a home or other conventional domestic facility having a typical and/or standard water pressure of generally about 60 psi.

In situations involving the delivery of water along a conventional water supply line to a domestic or commercial facility a metering of the water supply takes place generally at the point of delivery to the domestic or commercial facility. A conventional water meter assembly may vary in both structure and operation but is typically provided to allow water utility companies or other agencies to charge for water, based on the amount used. As a result, the metering of water delivered from a water utility company to any facility is widely considered to be an acceptable practice and a fair means of charging for the quantity of water utilized.

The monitoring procedure performed by the water meter being indicative of the quantity of water utilized, is accomplished in numerous ways including, but not limited to, the manual "reading" of the meter and the delivery of the results of the reading to a billing facility associated with the water utility. However, many cities are increasingly installing automatic meter reading systems to prevent fraud and lower the labor cost of manual meter reading. In addition, it is believed that such automatic meter reading systems improve customer service and satisfaction by assuring a more accurate determination of the quantity of water being utilized.

However, as is commonly recognized by individuals connected to public utility distribution facilities, wherein the delivered water is metered to determine the quantity of water utilized, there is an occasional interruption of water supply. Such interruptions may be caused by repair, maintenance, malfunction, etc., and typically results in quantities of air entering into the water supply lines. As a result segments of air flow or air pockets travel along with the water flow within the water supply lines. As a result the combined air and water are delivered to the various facilities connected to the supply lines after first passing through the meter assembly associated therewith. Accordingly, the existing air is measured by the meter assembly and charged to the corresponding facility as used water. This is due to the fact that most, if not all meter assemblies associated with either domestic or commercial facilities are not structured to measure "fluid" flow and may not distinguish between the flow of air and the flow of water passing there through. Therefore, in situations where air enters the water supply line, the connected facility is charged for water that in fact has not been received due to the fact that the corresponding meter assembly registers the flow of air passing therethrough as conventional water flow.

In light of the above noted problem, there is a need in the area of water distribution for an appropriate way of eliminating the passage of combined air and water to a water meter assembly or other downstream delivery facility associated with either a domestic or commercial facility. Any cost or charge to the facility for water which was in fact not received or delivered would be thereby be eliminated. Such a proposed structure or assembly should efficiently function to prevent or significantly reduce the passage of air pockets or other air flow through the water meter assembly, while not interfering with the regular and intended supply of water delivered by the conventional water supply line. Further, such a proposed structure should include sufficient structural integrity and operative performance thereby assuring a long operative life, while not requiring frequent maintenance, repair or replacement. In addition, such a proposed and preferred assembly should be sufficiently low in initial cost to be economically viable for wide spread use in conventional water supply lines in a multitude of homes, businesses, etc. which are connected to water delivery systems throughout the world.

SUMMARY OF THE INVENTION

The present invention is directed to a valve assembly structured to eliminate or significantly reduce the presence of air traveling along a path of fluid flow and mixed with water within a conventional water supply line, wherein the path of fluid flow downstream of the subject valve assembly is comprised of water absent air or significantly reduced in the quantity of air remaining.

As is well recognized, there are occasional breakdowns, repairs, maintenance procedures, malfunctions, etc., of public water utility facilities and/or other water distribution and supply systems which results in the interruption of water delivery. Such interruptions, while not common, frequently result in air entering the path of fluid flow within the water supply lines. Such interruptive air flow may be in the form of air pockets or air segments or measurable quantities of air otherwise mixed water passing along the path of fluid flow within a delivery of supply line. As such, the included air is at least partially distinguishable from the conventional water flow passing through the water supply line(s). As a result, the homes, businesses and like facilities connected to the water supply lines are charged for water that was never delivered.

It is also recognized that in a conventional water supply facility controlled and regulated by a public water utility, water is delivered to most domestic and commercial facilities at a water pressure of generally about 60 psi. In contrast, the encroachment of air into the water supply line is typically delivered to the connected home or other intended facility, as well as to the meter assembly associated therewith, at a much lower pressure of generally about 0.3 kg f/cm2. Therefore, the air pressure of the air being delivered to the water meter assembly is significantly lower than the water pressure of the supply of water delivered to the corresponding meter assembly.

The present invention is therefore directed to the aforementioned valve assembly, which is structured to remove or significantly eliminate the air prior to its passage through the meter assembly or its delivery to other downstream locations. As a result any cost or charges associated with the passage of air through the meter assembly will be avoided, thereby providing a more accurate representation of the quantity of water actually delivered to the facility.

More specifically, the valve assembly of the present invention includes a valve body including a leading or sealing portion disposed in sealing relation to the interior surfaces of a water supply line and is therefore disposed in exposed, interruptive and sealing relation to a path of fluid flow passing along and within the supply line. Therefore the leading or sealing portion may be accurately described as including an exterior or upstream side or face, which is directly exposed to the oncoming water/air passing along the path of fluid flow within the delivery line. In contrast the interior or downstream side or face is not directly exposed to the path of fluid flow, but is effectively located on an interior of the valve body.

The valve body also includes at least one, but in some applications, a plurality of valve members cooperatively disposed and structured with a corresponding number of openings formed in the leading or sealing portion. A biasing assembly is disposed and structured on the valve body so as to normally bias the one or more valve members into sealing relation with the corresponding one or more openings in the sealing portion. As such, each of the one or more openings in the sealing portion define a valve seat to receive a corresponding one of the valve members in sealing relation thereto, when the valve members are in a "sealing orientation". Moreover, each of the valve members include a proximal or outermost end surface positioned in directly exposed relation to the path of fluid flow. As a result, pressure created by fluid passing along the path of fluid flow is exerted on the outer or upstream end surfaces of the plurality of valve members.

In order to eliminate or significantly reduce the quantity of air existing within the water flow passing along the path of fluid flow, the biasing assembly is structured to exert a predetermined biasing force on the plurality of valve members so as to maintain them in the sealing orientation. When the valve members are in the sealing orientation, the fluid traveling along the path of fluid flow will be prevented from passing through the openings, defining the valve seats and beyond or downstream of the valve body. This blocking of the fluid flow will be maintained until the pressure exerted on the exposed end surfaces of the valve members reaches or exceeds the predetermined biasing force exerted on the valve members by the biasing assembly and serving to maintain the valve members in the sealing orientation.

As generally set forth above, in conventional water supply lines the pressure of water flow passing therethrough is generally in the range of 60 psi. However when the amount of water is mixed with the air, the amount of pressure exerted on the external, exposed end surfaces of the valve members is less than the conventional water pressure of 60 psi. As a result the combined air and water pressure of the fluid flow passing along the path of fluid flow will be less than the predetermined biasing force and the plurality of valve members will be maintained in their sealing orientation. However, due to the fact that air is more easily compressed than the water, the air exerting pressure on the plurality of valve members will be compressed and/or displaced away from the valve body, resulting in the pressure being exerted on the valve members being derived primarily from water, absent any air pressure, Therefore the water pressure, absent air, exerted on the valve members will be substantially equal to the conventional water pressure (such as 60 psi) and will thereby be sufficient to overcome the predetermined biasing force. The valve members will thereby be forced out of the sealing orientation into the open orientation. As a result, the plurality of openings or valve seats formed in the leading or sealing portion will be opened allowing the water to pass therethrough to a downstream location of the valve assembly and/or to a water meter. As a result, the water meter will register only the quantity of water passing therethrough absent the inclusion of air mixed therewith.

Upon a decrease in the pressure being exerted on the exposed portions of the plurality of valve members, due to additional air being mixed with the water flow, the predetermined biasing force will then cause the plurality of valve members to move to the aforementioned sealing orientation stopping water flow beyond the valve body until the additional air is removed therefrom and the conventional water pressure exerted on the plurality of valve members is reestablished.

Additional structural and operative features of the valve body include a retaining structure disposed in fixedly interconnected relation to the plurality of spaced apart valve members. Moreover, the retaining structure and accordingly, the plurality of valve members are at least partially connected in biased relation to the aforementioned biasing assembly. Therefore the disposition and structure of the biasing assembly is such that the retaining member will move with the plurality of valve members between the aforementioned sealing orientation and open orientation.

In order to accomplish proper orientation and alignment of the plurality of valve members with corresponding ones of the plurality of openings or valve seats, a stabilizing assembly is also included on the valve body. More specifically, the stabilizing assembly includes a plurality of stabilizing members fixed relative to the sealing portion and disposed to at least partially restrict displacing movement, such as lateral movement, of the valve members as they are being forced between the sealing orientation and the open orientation. In at least one embodiment, the plurality of stabilizing members are spaced in alternating relation to the plurality of valve members so as to be disposed therebetween as the valve members move between the sealing and open orientations. As a result, the disposition, structure and/or configuration of the plurality of stabilizing members restrict lateral movement or inadvertent displacement of the valve members out of their aligned relation to corresponding ones of the valve seats.

Additional operative and structural features of the biasing assembly comprises an elongated shaft or stem movably disposed on the valve body and extending at least partially through an interior thereof. A proximal end of the shaft or stem may extend through an aperture formed in the leading or sealing portion of the valve body which is independent of the aforementioned openings or valve seats. The opposite or distal end of the shaft is at least partially connected to the aforementioned retaining structure in a manner which facilitates the exertion of the predetermined biasing force on both the retaining structure and the plurality of valve members. Moreover, the biasing assembly includes at least one biasing member disposed in surrounding relation to a length of the shaft on the interior of the valve body. The at least one biasing member is captured or retained and cooperatively disposed and structured to normally exert an outwardly directed biasing force on the shaft. Due to the fact that the distal end of the shaft is at least partially connected to the retaining structure and thereby to the plurality of valve members, the biasing force exerted on the retaining structure and the valve members will force the valve members into the aforementioned sealing orientation.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
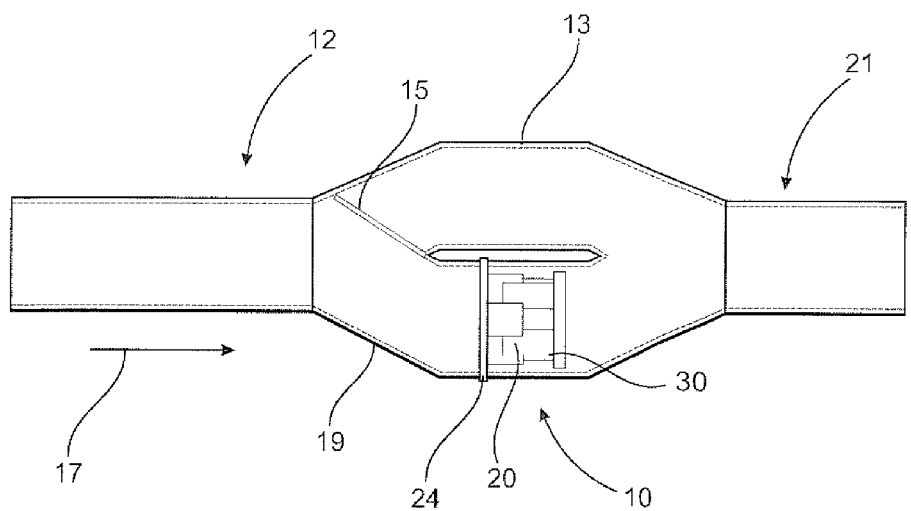
FIG. 1 is a perspective, schematic representation of the air flow restricting valve assembly of the present invention as operatively applied in a water supply line or like water flow conduit.
Figure 2:
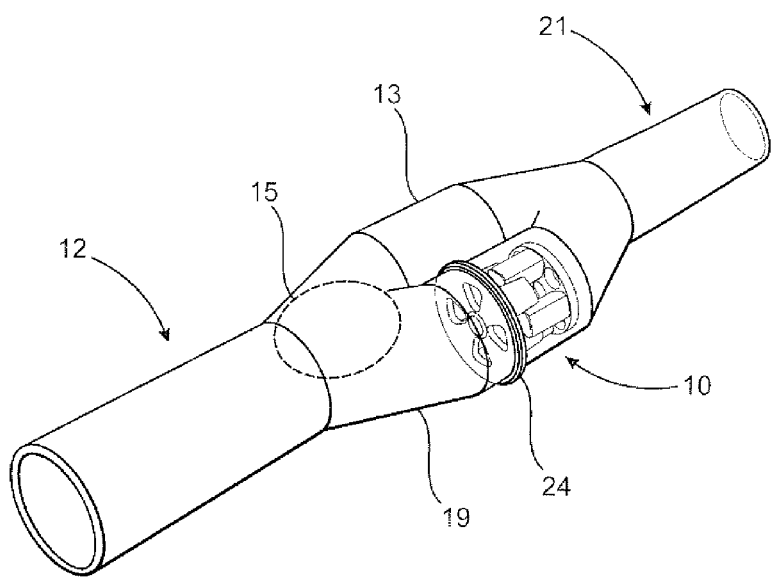
FIG. 2 is a perspective, schematic representation of the embodiment of FIG. 1.
Figure 2A:
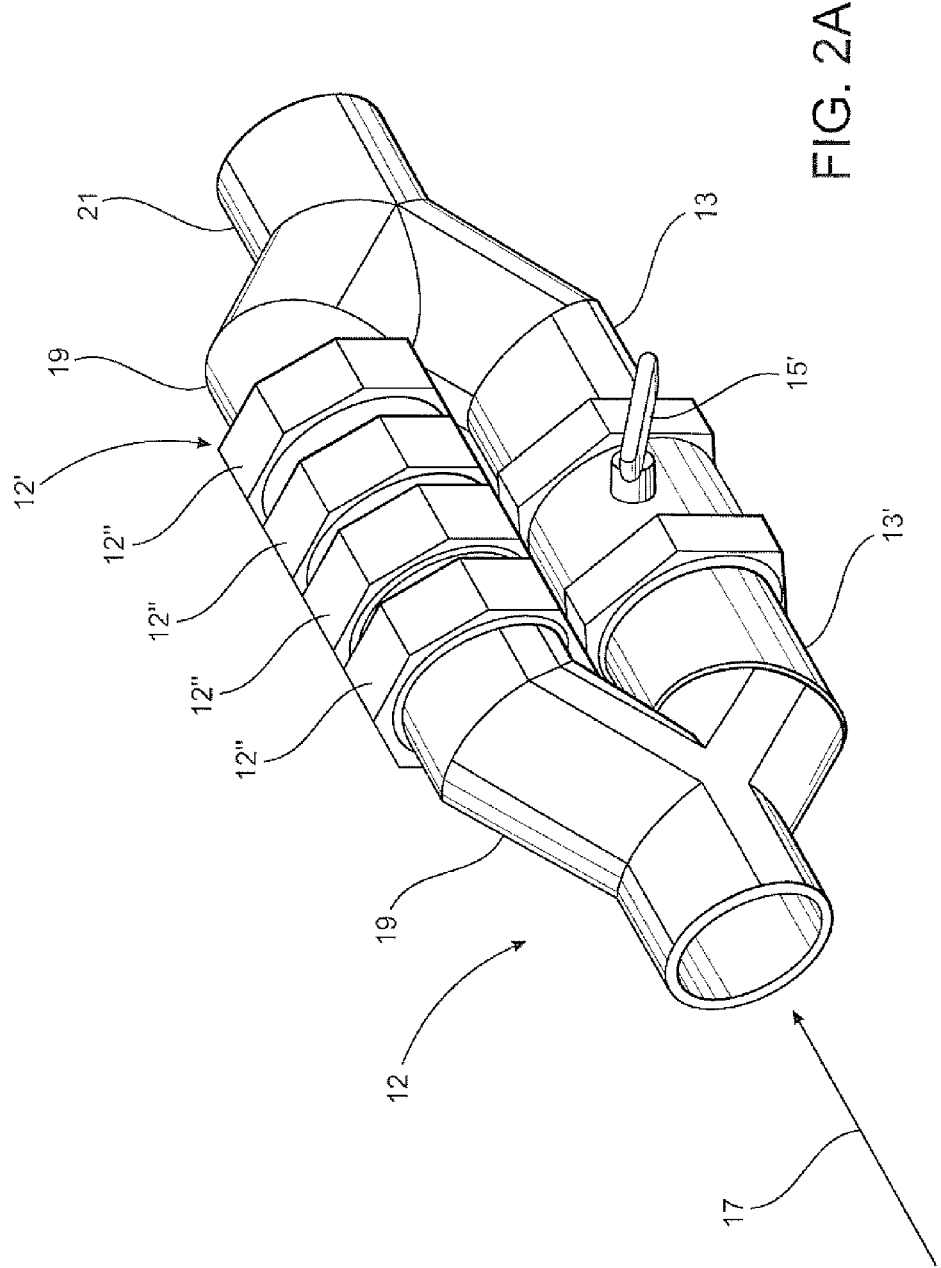
FIG. 2A is a perspective view of a casing and cooperative structure used to removably install the air flow restricting valve in the water supply line in accord with the schematic representations of FIGS. 1 and 2.

As represented in the accompanying drawings, the present invention is directed to a valve assembly generally indicated as 10 structured to be inserted within a water supply or delivery line generally indicated as 12 in the schematic representations of FIGS. 1-2A. The valve assembly 10 is structured to eliminate or significantly reduce the amount of air passing along a path of fluid flow within the interior of the water supply line 12, prior to the flow of fluid reaching a downstream location, such as a water meter. Specific practical applications disclosed in FIGS. 1 and 2 include the water supply or delivery line 12 including a bypass segment 13 and a flap valve or other fluid directing structure 15. Accordingly, water will pass along a path of fluid flow on the interior of the supply line 12 in accord with the represented directional arrow 17.

The bypass 13 and the flow directing structure 15 are provided to divert the flow of fluid in order to facilitate the removal, repair, replacement, etc. of the valve assembly 10 when such is needed. In accomplishing such maintenance or replacement procedures, the flow directing structure 15 or flap valve or other device will enable the closing of the line segment 19 leading to the valve assembly 12, by a manipulation of the lever or control member 15'. As represented in FIG. 2A the casing 12' used to operatively mount the valve 20 in the path of fluid flow and/or supply line is structured to provide access to the valve 20 and/or facilitate the removal of the valve or repair or replacement. More specifically, one or more connecting members or mounting rings 12" or other appropriate members are disposed and structured to facilitate such access to or removal of the valve 20 relative to the supply line 12. The connecting members 12" may be manipulated to secure or remove the valve from the supply line either by hand or by using appropriate tooling.

Therefore, upon appropriately positioning the lever or controller 15', the path of fluid flow 17 will bypass the valve assembly 10 and travel through the bypass branch 13 to a downstream location generally indicated as 21. While not specifically represented, the downstream location may lead directly to the water meter like structure of the type generally set forth above. However, the flow directing structure or flap valve 15 is normally in the position or orientation represented in FIG. 1. This will result in the path of fluid flow within the supply line 12 normally passing through the branch 19 and through the valve assembly 10 in order to facilitate the removal or significant reduction of air within the path of flow before it reaches the downstream location 21.

Figure 3:
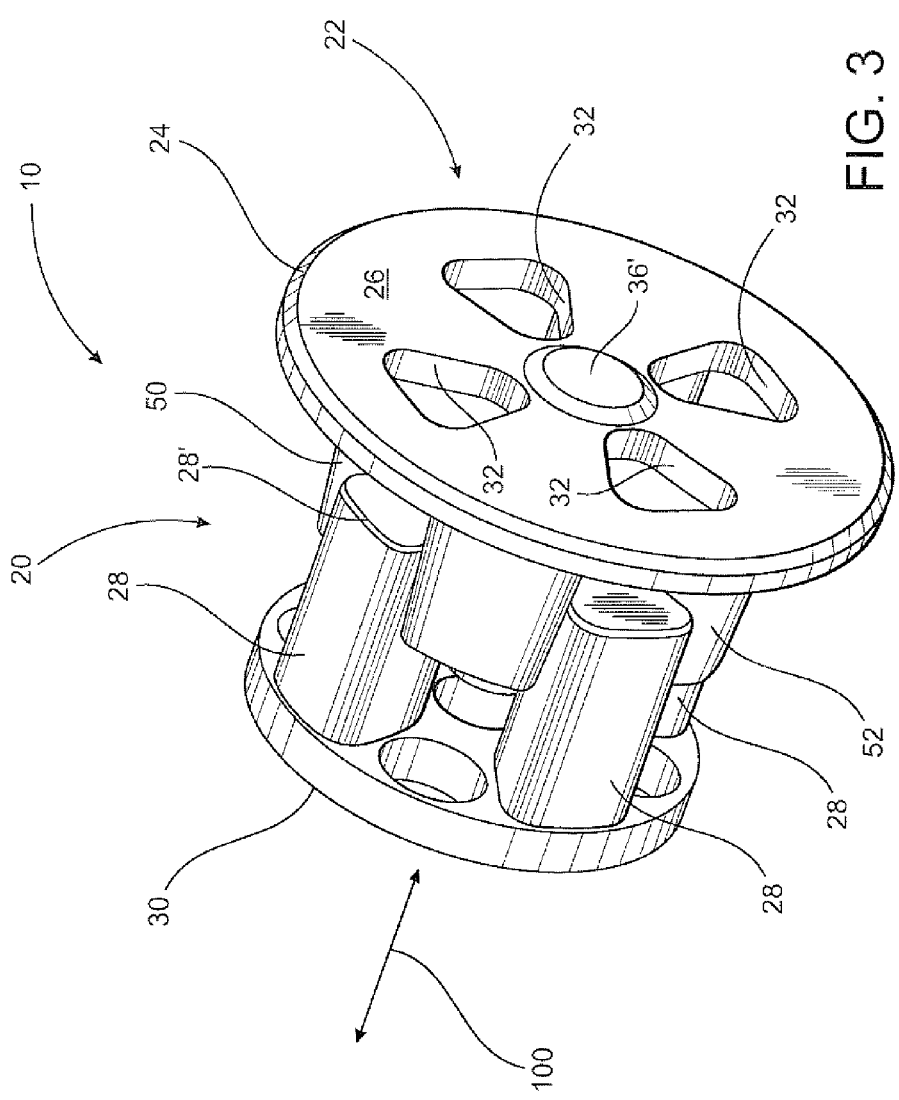
FIG. 3 is a front perspective view of at least one preferred embodiment of the valve assembly of the present invention in partially assembled form and in an open orientation.
Figure 4:
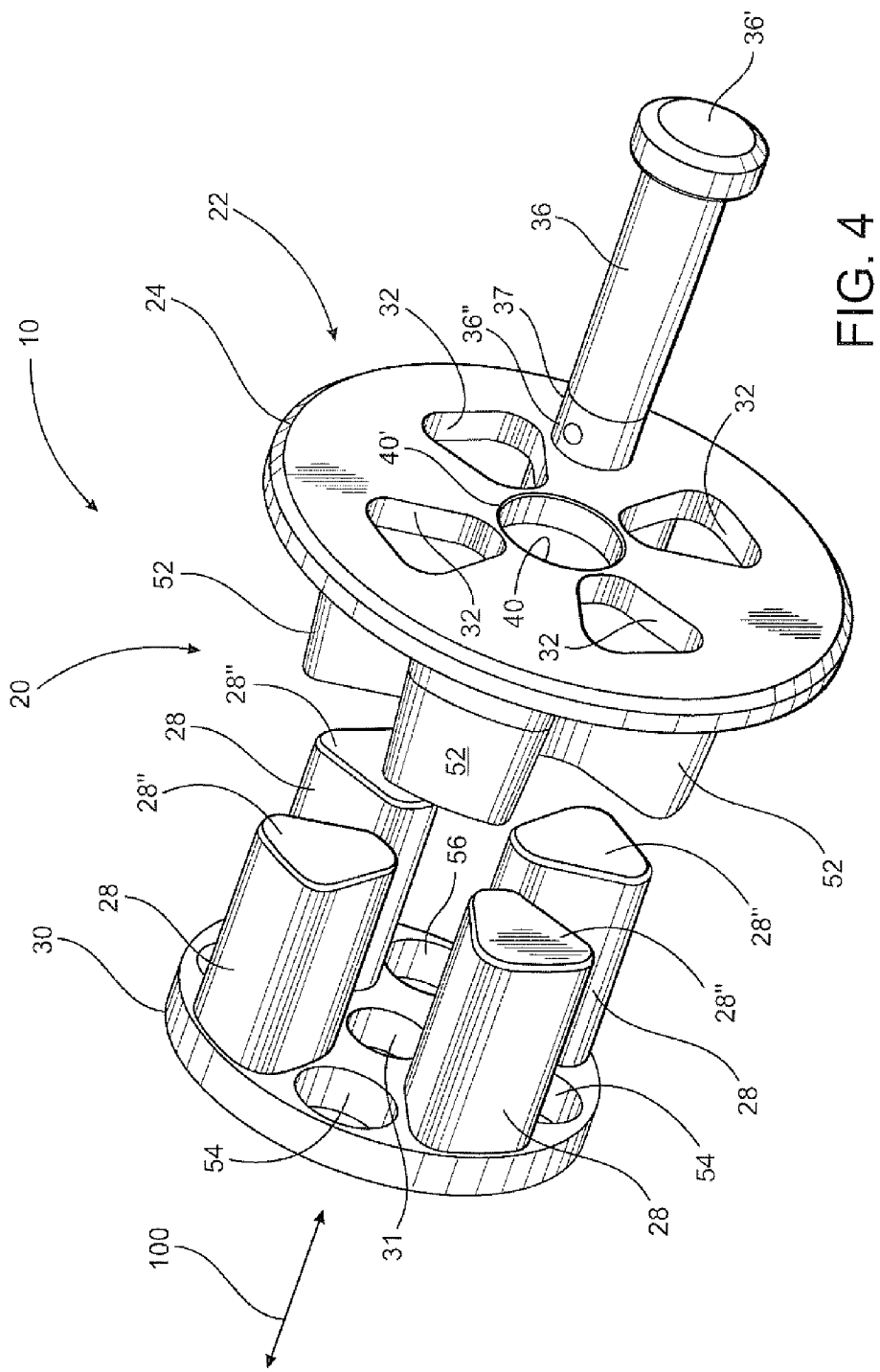
FIG. 4 is a front perspective view in exploded form of the embodiment of FIG. 1.
Figure 5:
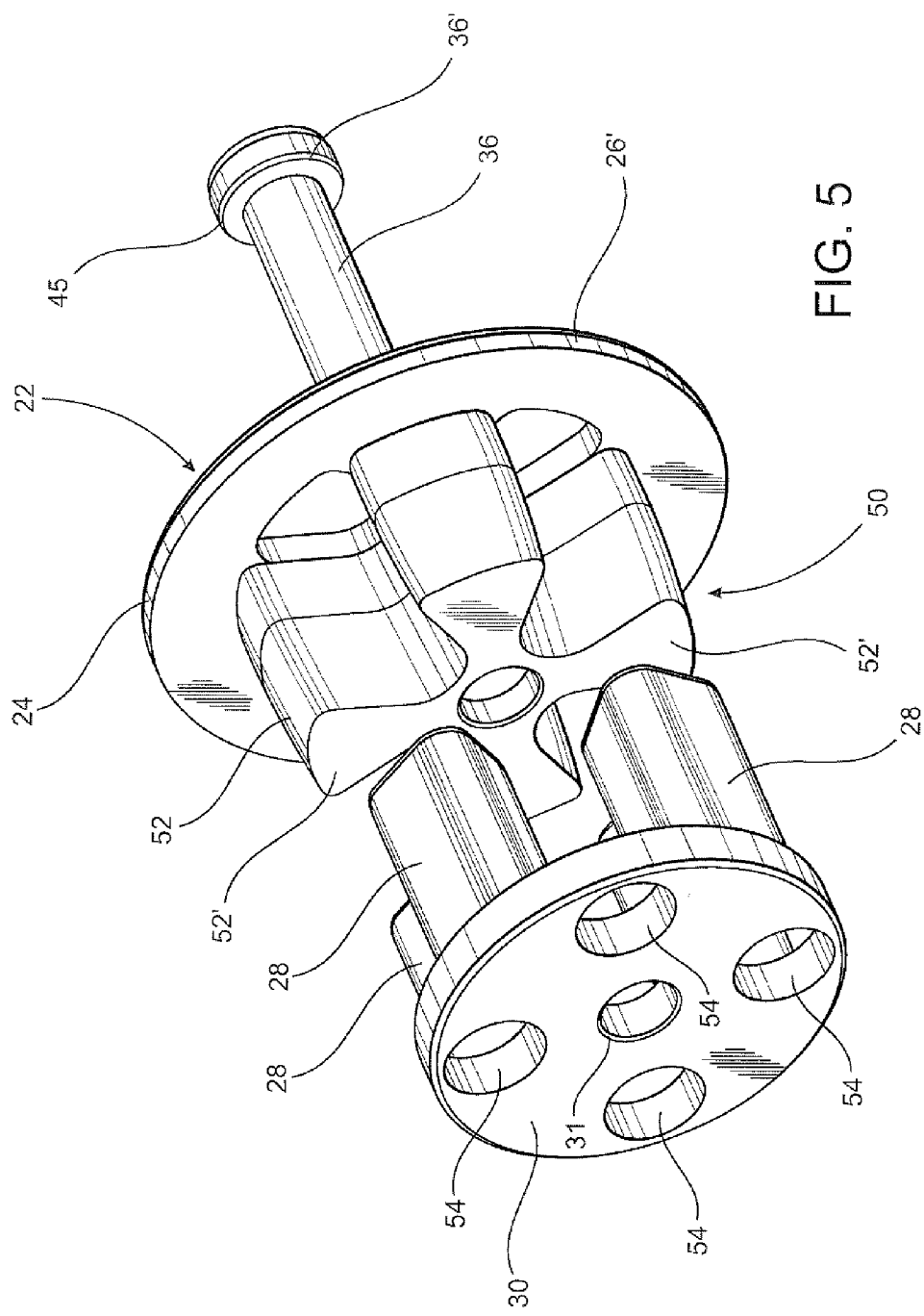
FIG. 5 is a rear perspective view in exploded form of the embodiment of FIGS. 3 and 4.

In further reference to FIGS. 1 and 3, the valve assembly 10 includes a valve body 20 represented in at least partially assembled orientation of FIG. 3. As such, the valve body 20 includes a leading or sealing portion generally indicated as 22. The sealing portion 22 may be in the form of a disk, plate or other appropriate structure and includes an outer periphery 24 disposed, dimensioned and configured to be disposed in sealing engagement with the interior surface of the water supply line 12 and more specifically the line segment or branch 19 in which it is located.

Therefore, the sealing engagement between the periphery 24 of the sealing portion 22 and the interior surface of the water supply line 12 and/or line segment 19 serves to dispose the valve body 20 in sealing interruptive relation to the path of fluid flow 17 passing through the water supply line 12 and line segment 19. When in such a sealed orientation, relative to the water supply line 12 and path of fluid flow 17, the outer end or upstream face 26 of the sealing portion 22 is positioned in direct exposure to the oncoming water and air flow passing along the path of fluid flow 17 as should be apparent. Accordingly, the sealing portion 22 represents an upstream part of the valve housing 20, wherein a retaining structure 30, represents the downstream portion of the valve body 20.

With primary reference to FIGS. 3-6, additional structural and operative features of the valve assembly 10, specifically including the valve body 20, comprise the provision of at least one, but more practically a plurality of valve members 28. Each of the valve members 28 is fixedly interconnected in spaced relation to one another by the retaining structure 30. In addition, the valve body 20 comprises at least one but more practically a plurality of openings 32 formed in the sealing or leading portion 22 and extending there through. As such, the openings 32 are disposed in fluid communication both with the outer or upstream side or face 26 of the sealing portion 22 as well as the inner face or downstream side 26' of the leading or sealing portion 22. In addition, the disposition, dimension and configuration of the plurality of openings 32 are such as to receive and sealingly engage the outer or proximal end 28' of each of the valve members 28. Therefore, when the corresponding ends 28' are disposed in closed, sealing relation to corresponding and/or aligned ones of the openings 32, the openings 32 thereby serve as valve seats for corresponding ones of the valve members 28. The ends 28' of each of the valve members are received in sealing engagement with the openings or valve seats 32 when in a "sealing orientation". When so oriented, fluid flow will be prevented from passing through the openings 32 into and downstream of the valve body 20 and thereby be prevented from passing to the downstream location 21 of the water supply line 12.

Accordingly, the plurality of valve members 28 are movably disposed on or within the valve housing 20 so as to move between the aforementioned sealing orientation and the open orientation of FIG. 3. When in the open orientation, the corresponding ends 28' of the plurality of valve members 28 are in a non-sealing, open orientation relative to corresponding ones of the openings 32.

Figure 6:
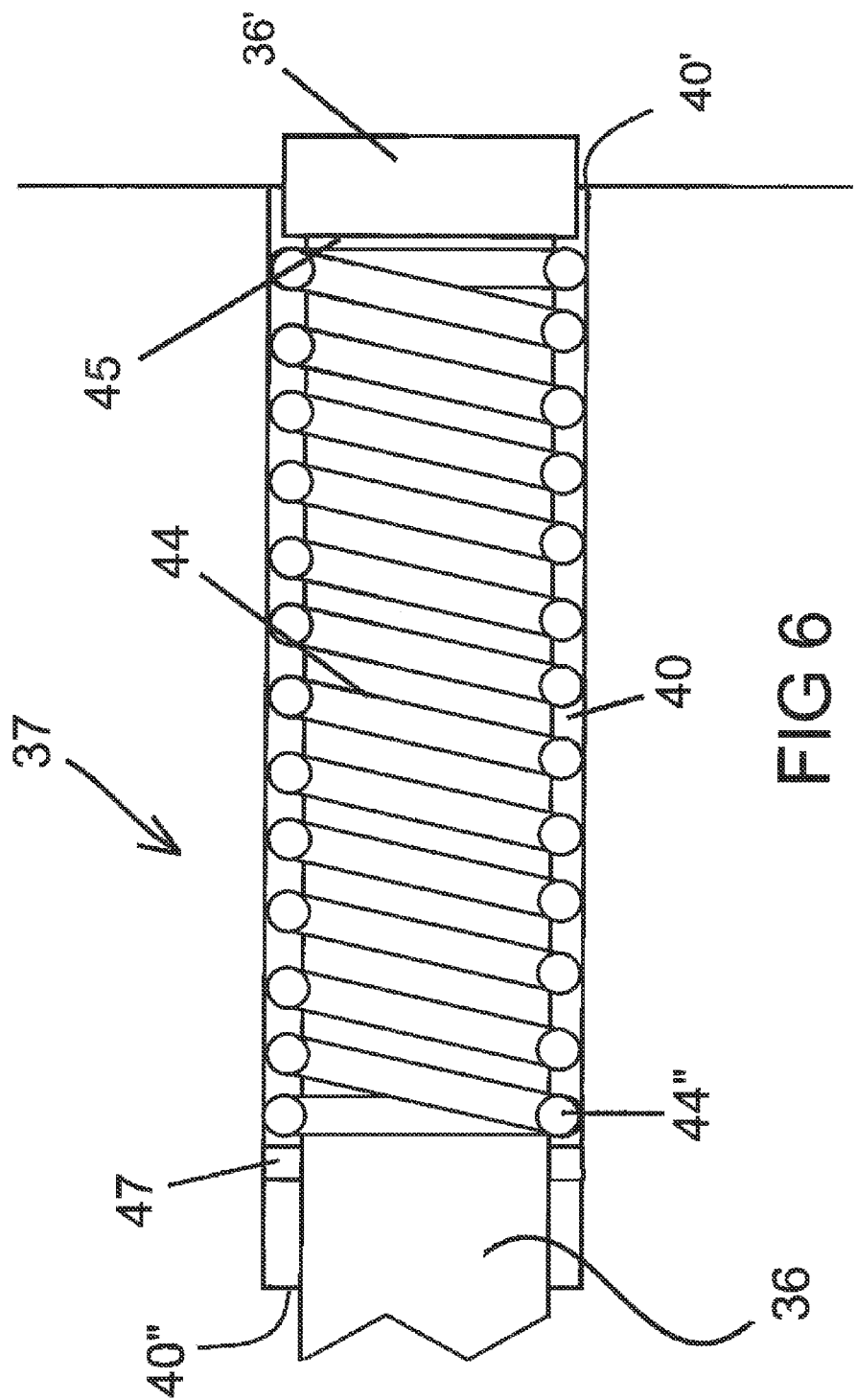
FIG. 6 is an interior detail view in schematic form of the biasing assembly being at least partially assembled.

The valve body 20 further includes a biasing assembly 37, represented in detail in FIG. 6 which regulates the movement of the plurality of valve members 28 between the aforementioned sealing orientation and open orientation. As such, the biasing assembly 37 includes an elongated rod or shaft 36 having an enlarged head or like structure 36' at a proximal or outer most end thereof. The shaft 36, when in an assembled orientation is disposed on the interior of the valve body 20 and more specifically within and extending along an elongated channel 40. Channel 40 has an opening 40' formed in the outer face or upstream side 26 of the sealing portion 22. The opposite end 40" of the channel 40 is open to allow passage of the distal end 36" of the shaft or rod 36 to extend there through. Moreover, when fully assembled, the distal end 36' of the shaft 36 also passes at least partially through the aperture 31 formed in the retaining structure 30. As such, the distal end 36' includes an appropriate structure, as at 37 for the receipt or connection of a locking ring, pin or other applicable structure which serves to at least partially connect the distal end 36" to the retaining structure 30 for purposes to be described in greater detail hereinafter.

The biasing assembly 37 further includes at least one biasing member 44 which may be provided in the form of a coil spring or other biasing device which is structured to exert a "predetermined biasing force" on the plurality of valve members 28, as will also be explained hereinafter. The disposition of the biasing member 44 is such that an outer end 44' thereof is directly engaged with the under cut 45 of the enlarged head 46. Also, when fully assembled, the inner or distal end 44" of the biasing member or spring 44 is disposed in engaging relation with a stop member 47. the stop member 47 is integrally or otherwise connected on their interior of the channel 40. Preferably, the stop member 47 extends radially inward from the interior surface of the channel 40 and provides a sufficient supporting surface to engage and retain the distal end 44" of the biasing member 44. As such, when in the fully assembled position, the shaft 36 is subjected to the biasing force of the biasing member or spring 44.

As set forth above, the distal end 36' is attached by an appropriate connector or the like 37 to the retaining structure 30.

As also set forth above, the retaining structure 30 is fixedly attached in interconnecting relation to the spaced apart valve members 28. Therefore, the interconnection of the biasing or spring member 44 to the shaft 36 and the interconnection of the distal end 36" to the retaining structure 30 serves to exert the aforementioned "predetermined biasing force" on the retaining structure 30 and accordingly serves to initially bias and maintain the plurality of valve members in the aforementioned sealing orientation.

When in the sealing orientation, it is emphasized that at least one preferred embodiment of the valve assembly 10 includes the exposed end surfaces 28" being preferably disposed in substantially flush, coplanar relation to the outer surface or upstream face 26 of the sealing portion 22. This flush, coplanar position between the end surfaces 28" of the valve members 28 and the outer surface or side 26 of the leading portion 22 facilitate establishment of the sealing orientation of the valve members 28 within the openings or valve seats 32. It is also of note that the end surfaces 28" will thereby be positioned in direct exposure to the oncoming path of fluid flow 17 and the pressure exerted thereby, as the water and/or air pass along the water supply line 12.

As a result, the pressure created by the passage of fluid along the path of fluid flow 17 will be exerted directly on the end surfaces 28" of the valve members 28. Therefore if the pressure of path of fluid flow 17 passing along the supply line 12 is greater or superior to the aforementioned "predetermined biasing pressure" exerted on the plurality of valve members 28 by the biasing assembly 37, the valve members 28 will be forced from the aforementioned sealing orientation to the aforementioned open orientation and out of sealing engagement with the valve seats or openings 32. This significantly greater pressure will thereby facilitate the path of fluid flow to continue through the openings 32 and beyond the sealing or leading portion 22 to a downstream delivery location 21 which, as set forth above, may be a water meter.

For purposes of clarity, the possible movement of the valve members 28 and the fixedly secured retaining structure 30 between the sealing orientation and the open orientation is represented by directional arrow 100. Accordingly, the operational features of the valve assembly 10 facilitate the removal of air mixed with water and/or air pockets contained within the water as the flow of water travels along the path of travel 17 on the interior of the water supply line 12. In order to accomplish air removal, the aforementioned biasing assembly is structured to exert the "predetermined biasing force" on the valve members 28 so as to maintain them in the aforementioned sealed orientation when air is contained within the water traveling along the path of fluid flow. In such a sealed orientation, fluid flow will not be allowed to pass beyond or downstream of the leading portion 22 in that the valve seats or openings 22 will be sealed and closed by the ends 28' of corresponding ones of the valve members 28.

Therefore a mixture or presence of air within the flow of water passing along the path of travel 17 and being exerted on the end surfaces 28', as well as the outer side or surface 26', will not be sufficient to overcome the predetermined biasing force exerted on the valve members 28 due to the specific structuring of the valve assembly 10 and/or pressure characteristics of the biasing member 44.

More specifically, for purposes of clarity and by way of example only if the pressure of water passing along the supply line 12 is assumed to be a standard or typical 60 psi, it should be recognized that quantities of air mixed with the water or defined as air pockets or air segments within the flow of water along the path of fluid flow 17 will lessen the pressure exerted on the end surfaces 28". As a result, the predetermined biasing force exerted on the valve members 28 will be sufficient to dispose and maintain the plurality of valve members 28 into the aforementioned sealing orientation relative to the sealing portion 22 and the valve seats or openings 32. However, the biasing assembly 37 and in particular the biasing member 44 will be specifically structured to exert a biasing force on the valve members 28 which is insufficient to overcome the conventional water pressure of 60 psi being exerted on the end surfaces 28" of the valve members 28, once the water has been compressed or displaced or otherwise removed from the path of fluid flow as it reaches the outer surface 26 of the sealing portion 22. The predetermined biasing force exerted on the valve members 28 is sufficient to maintain the valve members 28 in their sealing orientation when the end surfaces 28" are subjected to a combined air pressure and water pressure existing within the path of fluid flow. Such combined air pressure and water pressure will be less than the 60 psi water pressure (described by way of example only) of conventional water flow passing along the path of fluid flow 17 within the supply line 12.

However, the biasing assembly 37 is specifically structured to exert a biasing force on the plurality of valve members 28 which is insufficient to maintain the valve members in the sealing orientation and allows the valve members 28 to be forced into the open orientation when the end surfaces 28' are exposed primarily to water pressure which is substantially absent any air or air pressure within the path of fluid flow.

As set forth above, the valve members 28 and the fixedly secured retaining structure 30 move in a substantially reciprocal manner, in accord with the directional arrow 100, relative to the remainder of the valve body 20. Therefore reciprocal movement 100 of the plurality of valve members 28 between the sealing orientation and the open orientation must occur while the plurality of valve members are in a proper alignment, position and/or orientation relative to the openings or valve seats 32. Such proper orientation or alignment will assure that the ends 28' of the valve members 28 will be properly seated within the openings or valve seats 32 in order to establish the aforementioned sealing orientation.

In order to provide such a proper alignment or orientation of the valve members 28, the valve housing 20 further includes a stabilizing assembly 50. The stabilizing assembly 50 includes a plurality of stabilizing members 52 disposed in spaced relation to one another and are fixedly secured to the inner side or downstream side 26' of the sealing portion 22. As a result, the plurality of stabilizing members 52 will maintain their predetermined spacing from one another. The spacing between the stabilizing members 52 also corresponds to the spacing between the plurality of valve members 28, such that each of the stabilizing members 52 is movably disposed between adjacent, correspondingly positioned ones of the valve members 28 as generally represented in FIG. 3. In such a position and when at least partially assembled, the stabilizing members 52 will at least partially restrict movement or displacement of the valve members 58 from their interned and preferred aligned orientation or position relative to the corresponding valve seats or openings 32. The alternate, spacing of the valve members 28 and the stabilizing members 52 will restrict the lateral displacement or lateral movement of each of the valve members 28 thereby facilitating a proper alignment of the ends 28' with corresponding ones of the valve seats or openings 32.

As yet another feature which may be included in the valve body 20 is a plurality of downstream openings or passages 54, which may be formed in and pass through the retaining structure 30. These passages 54 are disposed in aligned relation to the distal ends 52' of the stabilizing members 52. Accordingly when in the valve members 28 are in the sealed orientation, the valve body 20 will be effectively "closed" and the corresponding ends 52' of each of the stabilizing members 52 will be disposed in overlying, at least partially covering and/or completely closing relation to the passages 54. In contrast, when the valve members 28 are in the open orientation the corresponding ends 52' of the stabilizing members 52 will be out of closing or covering relation to the plurality of passages 54 thereby further facilitating fluid flow through the passages 54 as a path of fluid flow stands downstream of the valve assembly 10.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A valve assembly structured to reduce the delivery of air to a downstream location in a water supply line, said valve assembly comprising:
    a valve body disposed along and at least partially defining a path of fluid flow within the water supply line,
    said valve body including a sealing portion disposed in an exposed, interruptive and at least partially sealing relation to said path of fluid flow,
    at least one valve member movably disposed on said valve body between a sealing orientation and an open orientation relative to said sealing portion and in exposed relation to fluid passing along said path of fluid flow,
    said valve body further including a biasing assembly disposed and structured to exert a predetermined force on said at least one valve member, and
    said predetermined force being sufficient to dispose and maintain said at least one valve member into said sealing orientation relative to said sealing portion when said at least one valve member is subjected to a combined air pressure and water pressure existing within said path of fluid flow;
    said valve body including a plurality of valve members and a plurality of openings formed in said sealing portion, said plurality of openings extending through said sealing portion in communicating relation with said upstream and downstream sides of said sealing portion, said plurality of valve members movably disposed between said sealing orientation and said open orientation relative to a plurality of valve seats and in direct exposed, interruptive relation to said path of fluid flow;
    said valve body further including a retaining structure fixedly interconnecting said plurality of valve members and movable therewith at least between said sealed and open orientations;
    said biasing assembly being interconnected to said retaining structure in biasing relation concurrently to each of said plurality of valve members; and
    a stabilizing assembly connected to said sealing portion in movement restricting relation to said plurality of valve members; said stabilizing assembly disposed and structured to maintain a predetermined position of said plurality of valve members upon movement thereof between said sealed and open orientations.

2. A valve assembly as recited in claim 1 wherein said biasing assembly is cooperatively structured with said at least one valve member to define said predetermined force.

3. A valve assembly as recited in claim 2 further comprising at least one opening formed in said sealing portion and extending therethrough in communicating relation with an upstream side and a downstream side of said sealing portion; said at least one opening disposed and structured to define a valve seat for said at least one valve member and a passage of fluid through said sealing portion when said one valve member is in said open orientation.

4. A valve assembly as recited in claim 3 wherein said sealing orientation comprises said at least one valve member disposed in closing, sealing engagement with said valve seat; said open orientation comprising said at least one valve member disposed in open, non-sealing relation to said one valve seat.

5. A valve assembly as recited in claim 1 wherein said predetermined force is sufficient to dispose and maintain said plurality of valve members into said sealing orientation relative to said sealing portion, when said plurality of valve members are exposed to a combined air pressure and water pressure of said path of fluid flow.

6. A valve assembly as recited in claim 5 wherein said sealing orientation comprises said plurality of valve members concurrently disposed in closing, sealing engagement with said plurality of valve seats while in directly exposed relation to said path of fluid flow.

7. A valve assembly as recited in claim 6 wherein said open orientation comprises said plurality of valve members concurrently disposed in open, non-sealing relation to said plurality of valve seats while in directly exposed relation to said path of fluid flow.

8. A valve assembly as recited in claim 1 wherein said stabilizing assembly comprises a plurality of stabilizing members each fixedly secured to said sealing portion and collectively disposed to maintain a predetermined alignment between said plurality of valve seats and said plurality of valve members upon movement of said plurality of valve members between said sealed and open orientations.

9. A valve assembly as recited in claim 8 wherein said plurality of stabilizing members are fixedly secured to a downstream side of said sealing portion in an alternating, laterally disposed relation to said plurality of valve members.

10. A valve assembly as recited in claim 1 wherein said biasing assembly comprises a shaft extending at least partially through said valve body and a biasing member disposed within said valve body in biasing relation to said shaft.

11. A valve assembly as recited in claim 10 wherein said shaft is disposed in biasing relation to said retaining structure and said plurality of valve members.

12. A valve assembly as recited in claim 11 wherein said biasing member is disposed in biasing relation to said shaft and further disposed and structured to normally bias said shaft, said retaining structure and said plurality of valve members into said sealed orientation.

13. A valve assembly as recited in claim 11 wherein said valve body comprises an elongated channel extending therethrough, said shaft movably disposed within said channel and said biasing member retained within said channel in biasing relation to said shaft; a distal end of said shaft connected in biasing relation to said retaining structure.

14. A valve assembly structured to reduce the delivery of air to a downstream location in a water supply line, said valve assembly comprising:

a valve body disposed along and at least partially defining a path of fluid flow in the water supply line, said valve body including a sealing portion disposed in sealing relation to the water supply line and exposed relation to said path of fluid flow therein, said valve body comprising a plurality of valve members and a plurality of openings formed in said sealing portion, said plurality of openings extending through said sealing portion in fluid communication with opposite sides thereof;

each of said plurality of openings defining a valve seat for a correspondingly disposed one of said plurality of valve members, said plurality of valve members movably disposed between a sealing orientation and an open orientation relative to said plurality of valve seats and further disposed in direct exposed relation to fluid passing along said path of fluid flow;

said sealing orientation comprising said plurality of valve members disposed in sealing engagement with said plurality of valve seats; said open orientation comprising said plurality of valve members disposed in spaced, non-sealing relation to said plurality of valve seats;

said valve body including a biasing assembly disposed and structured to exert a predetermined biasing force on said plurality of valve members, said predetermined biasing force being sufficient to dispose and maintain said plurality of valve members in said sealing orientation when said plurality of valve members are subjected to a combined air and water pressure of said path of fluid flow, and a stabilizing assembly connected to said sealing portion in at least partially movement restricting relation to said plurality of valve members; said stabilizing assembly disposed and structured to maintain a predetermined orientation of said plurality of valve members upon movement thereof between said sealed and open orientations.

15. A valve assembly as recited in claim 14 wherein said valve body further comprises a retaining structure fixedly interconnecting said plurality of valve members and movable therewith at least between said sealed and open orientations.

16. A valve assembly as recited in claim 15 wherein said biasing assembly is interconnected to said retaining member in concurrently biasing relation to each of said plurality of valve members.

17. A valve assembly as recited in claim 14 wherein said stabilizing assembly comprises a plurality of stabilizing members each fixedly secured to said sealing portion and collectively disposed to maintain a predetermined alignment between said plurality of valve seats and said plurality of valve members upon movement of said plurality of valve members between said sealed and open orientations.

18. A valve assembly as recited in claim 17 wherein said plurality of stabilizing members are fixedly secured to a downstream side of said sealing portion between and in an alternating relation to said plurality of valve members.

* * * * *